J. F. SCHWEIGER.
FARM GATE.
APPLICATION FILED FEB. 10, 1921.
1,418,332.
Patented June 6, 1922.
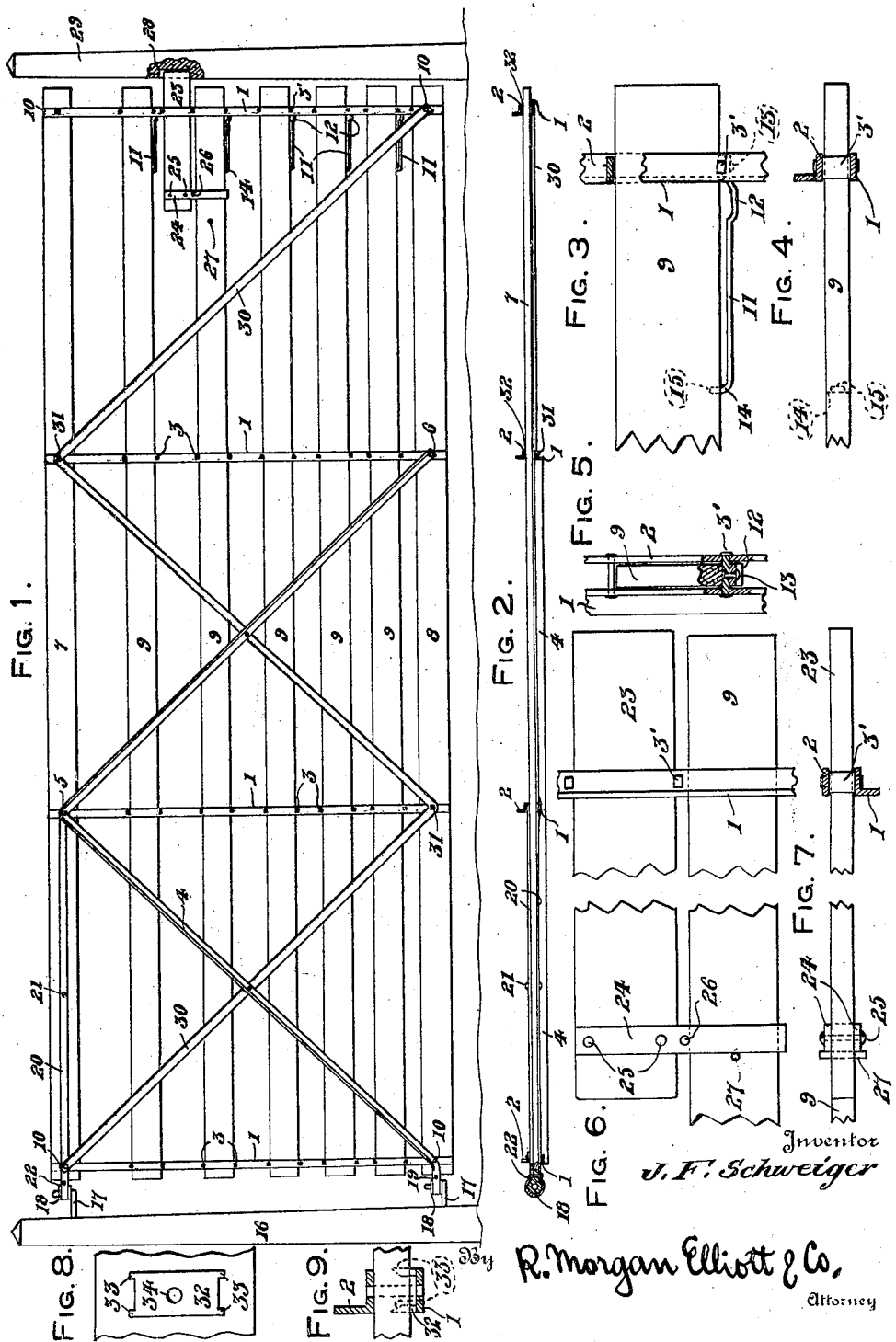

UNITED STATES PATENT OFFICE.

JOHN F. SCHWEIGER, OF FLORA, INDIANA.

FARM GATE.

1,418,332.   Specification of Letters Patent.   Patented June 6, 1922.

Application filed February 10, 1921. Serial No. 443,906.

*To all whom it may concern:*

Be it known that I, JOHN F. SCHWEIGER, a citizen of the United States of America, residing at Flora, in the county of Carroll and State of Indiana, have invented certain new and useful Improvements in Farm Gates, of which the following is a specification.

This invention relates to certain new and useful improvements in farm gates and has for one of its objects to provide a gate constructed of a metallic skeleton framework with spaced slats supported therein and assembled in a manner to entirely eliminate any possibility of the gate frame sagging at either end.

A further object of the invention resides in the provision of a farm gate embodying a plurality of spaced slats that are mounted in a skeleton framework assembled in a manner to maintain a correct alinement of the slats with the upper and lower slats of the gate permanently secured to the framework.

A still further object of the invention has reference to a farm gate wherein the spaced slats thereof are slidably mounted in a skeleton framework and retained in position by spring catches that are manually operable to release the slats to permit the sliding removal thereof.

With the above and other objects in view, the present invention consists in the novel form, combination and arrangement of parts hereinafter more fully described and shown in the accompanying drawings, in which like reference characters indicate similar parts throughout the several views.

In the drawings,

Figure 1 is a front elevational view, partly in section, of a farm gate constructed in accordance with the present invention, Figure 2 is a top plan view thereof, Figure 3 is a fragmentary side elevational view, partly in section of a portion of the gate showing the spring retaining catch for a sliding slat, Figure 4 is a fragmentary top plan view, partly in section of the device shown in Figure 3, Figure 5 is a fragmentary end elevational view, partly in section of the device shown in Figure 3 showing the manner of connecting the spring catch to the gate frame, Figure 6 is a fragmentary side elevational view showing the sliding gate latch, Figure 7 is a fragmentary top plan view, partly in section of the gate latch shown in Figure 6, Figure 8 is a fragmentary elevational view of a slat with a liner carried thereby, and Figure 9 is a detail sectional view showing a liner secured to a gate slat between upright brace bars.

Referring more in detail to the accompanying drawing, there is illustrated a fence gate embodying metallic framework having upper and lower fixed slats mounted therein with the intermediate slats slidably supported in the framework in spaced relations and retained in position therein by spring catches. Bearing bushings are carried by one end of the gate frame and are supported on pintles extending in vertical alinement from a gate post, while a sliding latch is associated with the other end of the gate frame for engagement with an adjacent gate post.

The metallic frame including the vertical and angularly disposed brace bars is shown more clearly in Figures 1 and 2, one side of the gate frame including vertically disposed flat strips 1 while companion angle iron strips 2 are maintained in spaced relations relative to the flat strips 1 by the connecting double ended rivet studs 3. The side of the gate adjacent the flat strips 1 is provided with a bracing angle iron 4 bent to inverted V-shape with the apex thereof secured by the bolt 5 to the second vertical flat strip 1 while the lower end of the brace iron 4 adjacent the swinging end of the gate is secured by the bolt 6 to an adjacent vertical flat strip 1, the other lower end of the V-shaped brace iron 4 extending to the lower end of the first vertical flat strip at the hinged end of the gate frame.

The connecting studs 3 perform one of the important functions in the construction of the gate frame in securing rigidity of the skeleton frame.

The wooden framework of the gate includes a plurality of slats embodying upper and lower slats 7 and 8 respectively with intermediate spaced slats 9. As shown in Figures 1 and 2, the bolts 5 and 6 connecting the V-shaped brace iron to the vertical flat strips 1 extend through the slats 7 and 8 respectively, thus anchoring the slats 7 and 8 to hold the same immovable relative to the metallic framework. It will also be observed by reference to Figure 1 that bolts 10 secure the end flat strips and angle irons 2 to the upper and lower slats 7 and 8.

The bolts 3 connecting the flat strips 1 and the angle irons are so spaced apart as to provide sliding guides for the slats 9 and to retain the slats in their proper positions in the metallic gate frame, spring catches of the type best illustrated in Figures 3 to 5 are associated with the swinging end of the gate and engage said slats. The spring catches are indicated by the numeral 11 having a slightly offset portion 12 to add resiliency to the catch with the end adjacent the offset portion secured to the connecting rivet stud 3' by the rivet 13 shown in Figure 5 while the other end of the catch 11 is angularly bent as at 14 to provide a hook for engaging in the recess 15 formed in the lower edge of the slat 9. It will therefore be seen that by pressing downwardly upon the free end of the catch 11 to disengage the hook 14 from the adjacent slat, that said slat will be capable of free sliding movement in the metallic gate frame.

A gate post 16 shown in Figure 1 carries pintles 17 in vertical alinement and upon which the gate frame is swingingly mounted, the mounting including bearing bushings 18 shown more clearly in Figures 1 and 2, the lower bushing being enclosed by the bent lower end of the brace iron 4 and secured therein by the transverse bolt 19. A U-shaped strap 20 incloses the upper slat 7 and is secured thereto by the bolts 21, 5, and 10 as shown in Figure 1 with the looped portion thereof enclosing the bushing 18 and secured thereto by the pin 22 and when so arranged, the alined bushings 18 are mounted on the pintles to provide a swinging hinge for the gate frame. The sides of the strap 20 directly contact the slat 7 and are positioned inwardly of the flat strip 1 and brace 4 on one side of the slat and on the other side thereof is inwardly of the angle iron 2. By this construction, it will be seen that the U-shaped strap 20 positioned at the upper side of the hinged end of the gate will support the greatest strain at that point while the weight of the gate and pressure on the lower pintle 17 will be in opposition to the brace iron 4.

To provide for an easy sliding removal of the slats 9, as above expressed, liners 32 of the form illustrated in Figures 8 and 9 are secured to slats 7 and 8 at each end of the two uprights 2, at the swinging end of the gate, and at the lower ends of all of the upright the strap 20 affording sufficient space for the other two uprights at the upper ends. The liner includes a flat plate preferably of rectangular form, and having an integral attaching prong 33 at each corner thereof to facilitate the mounting of the liner upon the slats 7 and 8, while a central opening 34 is provided in the liner to afford passage of the connecting bolts for the uprights and brace bars. It will therefore be seen that the liner 32 sufficiently spaces the uprights 1 and 2 so that no binding action upon the removable slats 9 will be permitted.

A retaining latch is provided for holding the gate in its closed position and comprises a latch bar 23 shown more clearly in Figures 1, 6, and 7 carrying a depending U-shaped strap 24 secured thereto as at 25 with the lower looped portion thereof enclosing an adjacent slat 9 while the strap 24 below the latch bar 23 carries a pin 26 resting upon the upper end of the adjacent slat to provide a sliding support for the latch. A pin 27 carried by the slat 9 forms a limiting stop to be engaged by the strap 24 to control the releasing sliding movement of the latch bar 23. The outer free end of the latch 23 projects beyond the adjacent end angle bar 1 and is adapted for reception in the keeper socket 28 in the adjacent fence post 29. By sliding the latch bar 23 to disengaging position relative to the fence post 29, the gate may be swung upon the hinge pintles 17 and as above stated, the U-shaped strap 20 and the brace iron 4 will maintain the gate frame in an absolutely true rectangular formation and eliminate any possibility of the gate sagging at either end.

If desired, a further bracing construction may be applied to the gate frame in the form of a flat iron strip 30 that extends from the gate frame in zigzag formation being connected to the upper and lower slats 7 and 8 and the vertical brace bars 1 and 2, the ends of the bracing strip 30 being secured in position by the connecting bolts 10 while the intermediate portions of the strip 30 are connected to the central brace bars 1 and 2 by the bolts 31. With this latter bracing construction, all of the vertical brace bars 1 and 2 are interconnected so that relative movement of any of the several metallic parts of the gate is prevented, and inasmuch as the wooden slats 7 and 8 are permanently connected to the metallic framework, drooping or sagging of the gate at the free swinging end thereof is entirely eliminated. Also, by the simple method of securing the intermediate slats 9 in position in the gate frame, in conjunction with the liner and strap, the same may be readily removed for replacement or repair in case of damage.

While there is herein shown and described what is believed to be the preferred embodiment of the invention, it is nevertheless to be understood that minor changes may be made in the form, combination and arrangement of parts without departing from the spirit and scope of the invention as claimed.

What is claimed as new is:

1. A fence gate of the type described comprising a metallic framework, upper and lower slats fixed thereto, intermediate slats removably mounted therein, a hinge mounting for the gate, a sliding latch carried by the free end of the gate and resilient catches for holding the intermediate slats in position.

2. A gate of the type described comprising spaced pairs of connected bars, gate slats positioned therebetween, an inverted V-shaped angle brace connected to adjacent pairs of brace bars, one end of the angle brace constituting a mounting bearing for the gate and means carried by the gate frame constituting a second mounting bearing.

3. A gate of the type described comprising spaced pairs of connected bars, gate slats positioned therebetween, an inverted V-shaped angle brace connected to adjacent bars with one end thereof terminating at the lower end of the gate and constituting a mounting bearing for the gate and a U-shaped strap carried by the upper end of the gate and constituting a mounting bearing for said gate.

4. A gate of the type described comprising a metallic frame, upper and lower slats fixed therein, intermediate slats slidably mounted in said frame and spring catches engaging said intermediate slats to retain the same in position.

5. A fence gate of the type described comprising a metallic framework, upper and lower slats fixed therein, intermediate slats slidably mounted within the framework, spacing liners secured to one side of the upper and lower slats adjacent parts of the metallic framework to provide a clearance space for the sliding slats and a hinge mounting for the gate.

6. A fence gate of the type described comprising a metallic framework embodying perpendicular spaced brace bars, rail slats positioned between the brace bars, an inverted V-shaped brace connected to adjacent brace bars, a zigzag bracing strip extending from one end of the frame to the other end thereof and connected to the brace bars and a hinge mounting for the gate.

7. A fence gate of the type described comprising a metallic framework embodying perpendicular spaced brace bars, rail slats positioned between the brace bars, an inverted V-shaped brace connected at its apex to one of the brace bars and at its lower ends to lateral brace bars, a zigzag bracing strip extending from one end of the frame to the other end thereof and secured to the brace bars and V-shaped brace and a hinge mounting for the gate.

In testimony whereof I affix my signature.

JOHN F. SCHWEIGER.